US006165599A

United States Patent [19]

Demeuse

[11] Patent Number: 6,165,599

[45] Date of Patent: Dec. 26, 2000

[54] BIAXIALLY ORIENTED FILM PREPARED FROM METALLOCENE CATALYZED POLYPROPYLENE

[75] Inventor: Mark T. Demeuse, Hockessin, Del.

[73] Assignee: Applied Extrusion Technologies, Inc., Peabody, Mass.

[21] Appl. No.: 08/929,949

[22] Filed: Sep. 15, 1997

[51] Int. Cl.[7] .................................................. B32B 27/32

[52] U.S. Cl. ........................ 428/213; 428/34.9; 428/516; 428/910

[58] Field of Search .................................... 525/240, 241; 264/290.2; 428/213, 910, 34.9, 516; 524/553, 554

[56] References Cited

U.S. PATENT DOCUMENTS

| | | | |
|---|---|---|---|
| 3,773,609 | 11/1973 | Haruta et al. | 264/290.2 |
| 4,883,698 | 11/1989 | Bothe et al. | 428/35.9 |
| 4,921,749 | 5/1990 | Bossart et al. | 428/216 |
| 5,573,717 | 11/1996 | Perffer et al. | 264/45.1 |
| 5,741,563 | 4/1998 | Mehta et al. | 428/35.1 |
| 5,795,946 | 9/1998 | Agarwal et al. | 526/348.1 |

FOREIGN PATENT DOCUMENTS

| | | |
|---|---|---|
| 0595252 | 4/1994 | European Pat. Off. . |
| 0716121 | 12/1996 | European Pat. Off. . |
| 0861877 | 2/1998 | European Pat. Off. . |
| WO9602388 | 1/1996 | WIPO . |

*Primary Examiner*—Stevan A. Resan
*Assistant Examiner*—D. Lawrence Tarazano
*Attorney, Agent, or Firm*—Caesar, Rivise, Bernstein, Cohen & Pokotilow, Ltd.

[57] ABSTRACT

Films prepared from metallocene polypropylene containing a low molecular weight hydrocarbon resin are shown to have certain improved properties as compared to such films prepared with such films prepared without said resin. In particular, these films have improved optical properties.

7 Claims, No Drawings

BIAXIALLY ORIENTED FILM PREPARED FROM METALLOCENE CATALYZED POLYPROPYLENE

This invention relates to improved polypropylene films and the manufacture thereof. More specifically, it relates to polypropylene films prepared from a new and improved polypropylene, which films exhibit improved properties as compared with polypropylene films heretofore known in the art.

BACKGROUND INFORMATION

Isotactic polypropylene is a well known article of commerce prepared by the polymerization of propylene in the presence of a catalyst comprised of an alkyl aluminum chloride and titanium tetrachloride. Such polypropylene is well suited to the preparation of packaging films and a large industry has grown up about polypropylene packaging films.

Recent work by certain polymer manufacturers has led to the development of a process for polymerization of propylene in the presence of metallocene compound catalysts. The resulting polymers, while quite similar to conventional isotactic polypropylene in many respects, do exhibit some unique properties and improvements in other properties as compared to the conventional polypropylenes.

Metallocene catalysts are defined as bridged bisdicyclopentadienyl or bisindenyl Group 4,5 or 6 transition metal dihalide derivatives. Specific metallocene catalysts known to be useful for producing polypropylene are discussed, inter alia, in EPA 485,820; 485,821; 485,822; 485,823; 518,092 and 519,237 and in U.S. Pat. Nos. 5,145,819 and 5,296,434. Other references that discuss the metallocene catalyzed process include EPA 351,932 and U.S. Pat. Nos. 5,055,438; 5,234,800; 5,272,016; 5,272,236 and 5,278,272. All of the cited documents are incorporated hereinto by reference.

The polymers resulting from metallocene catalysis are said to be of extremely uniform steric structure. Depending on the specific metallocene employed, the polymer can be of an isotactic structure wherein the pendant methyl groups on the polymer chain are located on alternating carbon atoms and are alternately oriented above and below the plane of the chain. With another metallocene, the polymer can be of syndiotactic structure wherein all of the pendant methyl groups are still located on alternate carbon atoms, but they are disposed predominantly on the same side of the chain.

In addition to the high degree of stereoregularity of the polymer chains, there is a very high degree of uniformity of molecular weight among the polymer chains, i.e., the molecular weight distribution is narrower than that found in conventional isotactic polypropylene. Thus, whereas a conventional polypropylene has a polydispersity ( i.e. the ratio of weight average molecular weight to number average molecular weight) on the order of about 7, a metallocene catalyzed polypropylene prepared by the same manufacturer has a polydispersity on the order of about 3. Likewise, in the manufacture of copolymers or terpolymers, the metallocene catalyst leads to a more even distribution of the comonomer or comonomers throughout the product. Yet another good feature of the metallocene polymers is that they have a lower concentration of low molecular weight, xylene soluble materials.

The narrower molecular weight distribution and the more even distribution of the comonomer leads to greater uniformity of the properties of the product. Thus, the metallocene catalyzed products exhibit a sharper melting point and a more uniform intrinsic viscosity throughout the product. These property improvements translate into improved flow properties and thus to improved processing during film extrusion and drawing. Processing is thus significantly facilitated.

However, in attempting to manufacture oriented packaging films with the metallocene catalyzed polypropylene in conventional processes and equipment, it has been found that the cast films exhibit very poor properties in terms of their optical qualities. Specifically, the films cast preparatory to drawing to effect orientation are extremely hazy, bordering on being translucent. In addition, they have a rough, sand paper-like surface.

It is the object of this invention to provide a polymer composition comprised of metallocene catalyzed polypropylene that can be employed in the manufacture of polypropylene film that does not exhibit the shortcomings of metallocene catalyzed polypropylene mentioned above.

It is a further object of the invention to provide superior polypropylene films based on metallocene catalyzed polypropylene and having a combination of improved properties as compared with polypropylene films heretofore known in the art.

BRIEF DESCRIPTION OF THE INVENTION

In accordance with this invention, it has been found that films prepared with a metallocene catalyzed polypropylene containing up to about 15% by weight of a low molecular weight hydrocarbon resin have excellent optical properties. That is to say, the high level of haze and the rough surface previously noted in the cast films are substantially completely absent in cast films prepared with the composition of metallocene catalyzed polypropylene and low molecular weight hydrocarbon resin according to this invention. Moreover, the optical properties of the film following biaxial orientation are improved as compared to those of unmodified isotactic polypropylene prepared via metallocene catalysis.

The improvement of the optical properties of both the cast film and the drawn film is a totally unexpected and surprising effect of the polymer compositions of this invention. When dealing with conventional isotactic polypropylene, the addition of another polymeric or resinous type material in any significant amount is usually detrimental to the optical properties of the polypropylene. This effect is less noticeable with the low molecular weight hydrocarbon resins than with most other polymeric additives. Nonetheless, it was very surprising to discover that these properties can be improved by adding the hydrocarbon resins. In fact, the optical properties of the metallocene polymers containing low molecular weight hydrocarbon resin are comparable to those of conventional isotactic polypropylene containing no low molecular weight hydrocarbon resin.

The invention defined in this application, then, is a composition useful for preparing oriented films, said composition comprising metallocene catalyzed polypropylene and a low molecular weight hydrocarbon resin, said resin being present in an amount up to about 15% by weight based on the total weight of the polypropylene and the resin. In a preferred embodiment, the low molecular weight hydrocarbon resin is present in an amount up to about 10%. In a most preferred embodiment, the low molecular weight hydrocarbon resin is present in an amount of about 1 to 5%.

In another aspect, the invention is an oriented polypropylene film comprised of metallocene catalyzed polypropylene and a low molecular weight hydrocarbon resin, said resin being present in an amount up to about 15% by weight based on the total weight of the polypropylene and the resin. In a preferred embodiment of the invention, the low molecular weight hydrocarbon resin is present in an amount up to about 10%. In a most preferred embodiment, the low molecular weight hydrocarbon resin is present in an amount of about 1 to 5%.

Films according to the invention can be either uniaxially or biaxially oriented. Preferably, the films will be biaxially oriented. Moreover, the films can be monolayer or multilayer (composite) structures.

DETAILED DESCRIPTION OF THE INVENTION

The metallocene catalyzed polypropylene employed in the manufacture of the films of this invention can be either an isotactic or a syndiotactic polymer. The preferred polymer is the isotactic species because this species has a higher melting point and accordingly, can be employed in higher temperature environments than can the syndiotactic species. A preferred metallocene catalyzed isotactic polypropylene is one having a melt flow rate between about 1 and 10 and more preferably, between about 1 and 5 dg/minute at 230° C. under a loading of 2.16 kg.

The low molecular weight hydrocarbon resins employed in the compositions and films of this invention are hydrogenated or unhydrogenated resins derived from olefin monomers, such as the resins derived from terpene monomers, coal tar fractions and petroleum feedstocks. Suitable resins include those prepared from terpene monomers (e.g., limonene, alpha and beta pinene, such as Piccolyte resins from Hercules Incorporated, Wilmington, Del., and Zonatac resins from Arizona Chemical Company, Panama City, Fla.). Other low molecular weight resins are prepared from hydrocarbon monomers and mixtures thereof, such as $C_5$ monomers (e.g., piperylene, cyclopentene, cyclopentadiene, and isoprene), oligomerized $C_5$ monomers, particularly the thermally oligomerized $C_5$ monomers such as the hydrogenated thermally oligomerized cyclopentadiene resins sold under the trade name Escorez (for example Escorez 5300) by Exxon Chemical Co. of Baytown, Tex. Others are prepared from $C_9$ monomers, particularly the monomers derived from $C_9$ petroleum fractions which are mixtures of aromatics, including styrene, methyl styrene, alpha methyl styrene, vinyl naphthalene, the indenes and methyl indenes and, additionally, pure aromatic monomers, including styrene, α-methyl-styrene and vinyltoluene. Examples of these resins include hydrogenated α-methyl styrene-vinyl toluene resins sold under the trade name Regalrez by Hercules Incorporated of Wilmington, Del. The hydrogenated $C_9$ and pure monomer resins are preferred. Particularly preferred are the hydrogenated cyclopentadiene resins and the hydrogenated aromatic resins derived from pure aromatic monomers, e.g., the hydrogenated α-methyl styrene-vinyltoluene copolymers.

In general, the low molecular weight resins useful in this invention are characterized by a molecular weight less than about 5000, a $T_g$ of about 50 to 100° C. and a softening point less than about 140° C.

Several embodiments of the invention are contemplated. In a first embodiment, the films of the invention can exist as stand-alone films of the blend of the metallocene catalyzed polypropylene-low molecular weight resin composition. These can be monolayer structures or they can be composite (multilayer) structures wherein the inventive film serves as a core having one or more functional layers on at least one of its surfaces. Most commercial polypropylene films are of the composite structure type and that is the preferred structure for the films of the invention.

The invention also contemplates an oriented composite film comprised of a polypropylene core layer having, on one or both of its surfaces, a film comprised of the polypropylene-low molecular weight hydrocarbon resin composition as described hereinabove.

In another embodiment of the invention, the film is an oriented composite film comprised of a polypropylene core having on one of its surfaces a thin layer of the metallocene polypropylene-low molecular weight resin composition and, on the other surface, a different functional layer.

When reference is made herein to a film, the term "film", depending on the context in which it is used, can refer to either a stand alone, self-supporting film or to a thin film employed as a functional layer on a self-supporting core.

In the embodiment of the invention wherein the film of the metallocene polypropylene-low molecular weight hydrocarbon resin is a stand alone monolayer film, the thickness of the film following orientation is typically in the range of about 0.25 to 1.0 mil (25 to 100 gauge). A preferred film thickness is from about 0.5 to about 0.8 mil (50 to 80 gauge). In the multilayer film embodiment in which the film of the invention is the core layer, the thickness of the core layer is preferably about 0.23 to 0.9 mil (23 to 90 gauge), while that of the individual functional surface layers is about 0.1 to 0.15 mil (10 to 15 gauge).

In the embodiment of the invention wherein the film of the metallocene polypropylene-low molecular weight hydrocarbon resin is a surface layer on a conventional polypropylene core, the thickness of that film is about 0.1 to 0.15 mil (10 to 15 gauge).

In the case of composite films, the core, whether it is of conventional polypropylene or the metallocene polypropylene-low molecular weight hydrocarbon composition of the invention, can be clear or it can be opaque. The core layer of the film can be rendered opaque by incorporating a particulate organic or inorganic opacifier into the polymer composition. Certain opacifiers impart opacity by causing microvoiding of the polymer matrix about the opacifier particles during the orientation drawing operation. Examples of such opacifiers include calcium carbonate, silicon dioxide, aluminum silicate and magnesium silicate. Other materials such as certain coloring pigments can cause opacity without voiding if present in sufficiently high loading. An example of such a coloring pigment is titanium dioxide.

In the case of opaque films, the total film thickness is typically somewhat thicker than is that of a clear film. Thus, an opaque film is usually on the order of about 1 to 1.5 mil in thickness and preferably on the order of about 1 to 1.3 mil with the functional layers being of the same thickness as those on a clear film.

Composite films prepared making use of the metallocene polypropylene-low molecular weight hydrocarbon resin composition of this invention as a surface layer on a polypropylene core can have the said composition on either one or both surfaces of the core layer. If the composition is present on only one of the surfaces, the other surface can have a layer of a different material thereon. When the composition according to the invention is employed as a core of a composite structure, a surface layer can be included on either one or both of its surfaces.

In either case, the composition of the functional layers is dictated by the purpose that these layers are intended to serve. Thus, these layers may or may not be of the same composition as the core. In fact, the functional layers need not even contain polypropylene. For example, composite films frequently carry a heat seal layer. Such layers comprise material of lower melting point than the core so that when heat is applied to effect the seal, the orientation of the core layer will not be disturbed. A commonly used heat seal layer is comprised of a terpolymer of propylene, ethylene and butene-1. Other polymers that can be employed include polyvinyl or polyvinylidene chloride.

Another frequently used functional layer is a cold seal layer. In this layer, the polymer component will frequently be the same as that of the core layer, though, here again, it need not be the same. To prepare a cold layer, a cold seal adhesive, such as, e.g., a rubber adhesive is applied to the surface of the polymer layer.

Other commonly used functional layers include a slip layer to facilitate handling of the film during later converting operations. Such a layer is comprised of a polypropylene containing a slip agent such as a high molecular weight fatty acid amide. A functional layer may also contain an antiblock additive to facilitate unwinding of the film after it has been wound at the terminus of the film manufacturing process. The polypropylene content of such layers likewise may or may not comprise metallocene catalyzed polypropylene according to the invention.

Films according to the invention are found to have improved properties in several respects as compared to films prepared with the presently known isotactic polypropylenes. Thus, the films according to the invention have a higher tensile modulus than do either the conventionally known isotactic polypropylene films or films of the metallocene polypropylene containing no low molecular resin. Whereas a biaxially oriented film of conventional polypropylene drawn 6× in the bubble process at 140° C. will typically have a tensile modulus on the order of about 300,000 psi, a metallocene polymer containing a low molecular weight hydrocarbon resin according to the invention, drawn under similar conditions, typically has a tensile modulus about 25% higher. This greater stiffness is significant as it allows one to prepare a thinner film of the same modulus when preparing films with the compositions of the invention. Likewise, it allows one to prepare a stiffer film at the same thickness.

Another property improvement that has been noted is a decrease in the moisture vapor transmission rate (MVTR) of the films. The MVTR of a 70 gauge (0.7 mil) film of conventional isotactic polypropylene is on the order of about 0.45–0.50 gm/100 $in^2$/24 hours, which is considered to be good. However, that of a film of the same thickness according to this invention is on the order of about 0.30–0.40 gm/100 $in^2$/24 hours. The art is constantly searching for effective ways to reduce both moisture and air permeability of packaging films and this is a welcome property improvement In the case of clear films, whether monolayer or composite, the good optical properties, i.e., gloss, haze and clarity, to which reference has been made hereinabove, are significant film quality parameters and are essential to commercial acceptance of the film. With respect to a composite film having an opaque core, the good clarity and haze are less significant, but the good gloss values are essential to the commercial acceptance of the film.

Films according to the invention can be prepared by extruding the composition of the invention at a temperature of about 230 to 250° C., quenching the extrudate to form a cast film, then reheating the cast film to about 130 to 150° C., drawing the said cast film to a draw of about 6 to 10× in both the machine and the cross direction and recovering a biaxially oriented film.

When preparing films using the compositions of the invention, it is found that the energy required to draw the films is reduced as compared with that required to draw films of straight metallocene polypropylene. The reduction of the energy required is indicated by the stress required to accomplish the drawing. This reduction of the stress is shown in the following table wherein stress to draw at several combinations of draw temperature and low molecular weight hydrocarbon resin level is shown. The low molecular weight hydrocarbon resin employed was Hercules Regalrez 1128, a hydrogenated copolymer of vinyl toluene and α-methyl styrene (Hercules Incorporated, Wilmington, Del.).

| Draw Temp. | Wt % resin | Yield Stress |
|---|---|---|
| 135° C. | 0 | 410 psi |
| " | 1 | 376 psi |
| " | 3 | 324 " |
| " | 5 | 285 " |
| 145° C. | 0 | 165 psi |
| " | 1 | 142 " |
| " | 3 | 125 " |
| " | 5 | 108 " |

Films according to the invention can be prepared by methods conventionally employed in the film making art. With specific reference to the multilayer films of the invention, there can be employed coextrusion, extrusion coating or lamination. The preferred method is coextrusion wherein the various layers are extruded simultaneously through a multi-layer die and immediately brought together in the molten state so that they are permanently bonded upon solidifying.

The films can be monoaxially or biaxially drawn to effect molecular orientation thereof and improve their properties, specifically, their tensile strength and tensile modulus (stiffness). Most commercially desirable films are biaxially oriented and that is preferred for the films of the invention. Film forming and drawing to effect orientation can be carried out by conventional techniques, i.e. the well known tubular (bubble) process or the equally well known tenter process can be employed.

When the films are drawn by the bubble process, the draw is effected simultaneously and uniformly in the machine and cross directions to about 6×. Using the tenter process, drawing is carried out sequentially to about 5× in the machine direction and to about 10× in the cross direction.

Conventional additives, in conventional amounts, can be included in the compositions of the invention and in the various layers of the composite films, provided that no additive should be included that can negatively affect the performance of the layer into which it is incorporated or that can migrate into another layer and negatively affect the performance of that layer in carrying out its intended function. Suitable conventional additives include antioxidants, pigments, orientation stress modifiers, flame retardants, antistatic agents, antiblocking agents, antifoggants and slip agents.

The films of the invention are useful in any of the applications in which conventional isotactic polypropylene is presently employed. They are particularly useful as packaging films, either as shrinkable films or as barrier or printable films after suitable treatment to render the surface polar so that a polar coating material will adhere thereto. They can also be used as the dielectric component in electrical condensers and as label stock due to their greater stiffness as compared to conventional polypropylene. Other suitable applications will be apparent to the practitioner.

In the examples that follow, films were prepared by initially melt extruding the metallocene polypropylene-low molecular weight hydrocarbon resin composition through a Killion single screw extruder (Killion Extruders, Inc., Verona, N.J.) at about 240° C. onto a casting roll maintained at about 55° C. for quenching. Extrusion was carried out at about 3.3 fpm. A quenched cast film of about 23 mil thickness was recovered.

The cast film was subjected to a 6× by 6× draw on a T.M. Long stretcher (T. M. Long Corporation, Somerville, N..J.). Drawing was effected at about 140° C.

EXAMPLE 1

The film of this example was prepared with a metallocene polypropylene designated EOD 96-12 (Fina Oil and Chemical Co., Deer Park, Tex.). This polymer had properties as follows:

| | |
|---|---|
| Melt flow | 2.5 dg/min. @ 230° C. |
| Xylene solubles | 0.2% |
| Polydispersity | 3 |
| Melting Pt. (DSC) ° C. | 154 |
| Δ H, J/g | 87 |
| Recrystallization Temp. | 107 |

This polymer was blended with a hydrogenated copolymer of vinyl toluene and α-methyl styrene (Regalrez 1128 from Hercules Incorporated, Wilmington, Del.) to prepare two blends. One of these blends contained 5% by weight of the resin and the other contained 10% by weight, based on the weight of the blend.

Following a 40 second preheat at 140° C. the 5% sample was drawn 6× by 6×, then relaxed 10%. The 10% sample was preheat for 55 seconds and drawn 6X by 6×, also at 140° C. and relaxed 10%.

A control specimen containing none of the resin was also drawn 6× by 6× using the same conditions as were used for the 5% resin sample.

Optical properties of the samples were measured according to ASTM D-1 003. MVTR was measured according to ASTM D-372 at 100° F. and 90% R.H. Test data are recorded in Table 1.

TABLE 1

| % Resin | % Haze | % Clarity | % Gloss | MVTR[1] |
|---|---|---|---|---|
| 0 | 1.00 | 94.6 | 92.4 | 0.38 |
| 5 | 0.43 | 98.3 | 95.4 | 0.37 |
| 10 | 0.26 | 99.2 | 95.7 | 0.35 |

[1]gm/100 sq. in/24 hours

The dramatic improvement in the optical properties is readily seen in the data recorded in Table 1.

EXAMPLE 2

A second series of samples was prepared wherein smaller amounts of the hydrocarbon resin were added to the polymer. The same polymer as was employed in Example 1 was employed in this example.

Each of the samples was drawn 6× by 6× at 140° C. and relaxed 10%. The preheat times for the different samples were: for the control, 40 seconds; for the 1% sample, 50 seconds; for the 3% sample, 55 seconds and for the 5% sample, 70 seconds. Property data for these samples are recorded in Table 2.

TABLE 2

| % Resin | % Haze | % Clarity | % Gloss | MVTR | MD Modulus[2] | % Δ[3] |
|---|---|---|---|---|---|---|
| 0 | 1.00 | 94.6 | 92.4 | 0.38 | 322,521 | 0 |
| 1 | 0.67 | 96.3 | 93.9 | 0.40 | 336,340 | 4.3 |
| 3 | 0.36 | 98.2 | 95.0 | 0.40 | 370,194 | 14.8 |
| 5 | 0.30 | 98.6 | 95.6 | 0.37 | 396,751 | 23.0 |

[2]modulus: pounds/sq. in.
[3]% change in modulus

Here again, the improvement in the optical properties is dramatic and readily seen. The same is true of the increase in the stiffness of the films according to the invention.

EXAMPLE 3

Another series of films of the compositions used in Example 2 were prepared and in this example these were drawn 7× by 7×. The control sample was preheated for 30 seconds at 140° C. and drawn at this temperature. The polypropylene/hydrocarbon blends were preheated for 35 seconds and drawn at 140° C. Property data for these sample are recorded in Table 3.

TABLE 3

| % Resin | % Haze | % Clarity | % Gloss | MD Modulus | % Δ |
|---|---|---|---|---|---|
| 0 | 0.8 | 96.4 | 92.6 | 395,410 | 0 |
| 1 | 0.51 | 97.8 | 94.3 | 435,050 | 10 |
| 3 | 0.34 | 98.8 | 95.1 | 436,016 | 10.3 |
| 5 | 0.27 | 98.9 | 95.6 | 442,196 | 11 |

Here again, the improvement in the optical properties is dramatic and readily seen. The same is true of the increase in the stiffness of the films according to the invention.

EXAMPLE 4

Another series of films were prepared wherein the low molecular weight hydrocarbon resin was a hydrogenated dicyclopentadiene having a softening point of about 140° C. (Res A2468 from Hercules Incorporated, Wilmington, Del.). Preheat times for the various samples were: for the control, 40 seconds; for the 1% sample, 45 seconds and for the 3% and 5% samples, 50 seconds. All samples were preheated and drawn at 140° C. Films were drawn 6× by 6×. Property data for these film samples are recorded in Table 4.

TABLE 4

| % Resin | % Haze | % Clarity | % Gloss | MD Modulus | % Δ |
|---|---|---|---|---|---|
| 0 | 0.76 | 96.6 | 94.3 | 389,314 | — |
| 1 | 0.52 | 97.7 | 96.3 | 393901 | 1.2 |
| 3 | 0.41 | 98.2 | 96.6 | 420,468 | 8.0 |
| 5 | 0.48 | 97.8 | 96.9 | 435,001 | 11.7 |

Here again, the improvements in the optical properties and the modulus resulting from the presence of the low molecular weight hydrocarbon resin are readily seen.

What is claimed is:

1. An oriented composite film comprised of a polypropylene core having, on one or both of its surfaces, a layer of a film comprised of a metallocene catalyzed polypropylene and a low molecular weight hydrocarbon resin, said resin being present in an amount up to about 15% by weight based on the total weight of the metallocene catalyzed polypropylene and the resin.

2. An oriented film according to claim 1 wherein the low molecular weight hydrocarbon resin is present in an amount up to about 10%.

3. An oriented film according to claim 1 wherein the low molecular weight hydrocarbon resin is present in an amount of about 1 to 5%.

4. An oriented film according to claim 1 wherein the polypropylene core contains an opacifying agent to render said core opaque.

5. An oriented composite film comprised of a polypropylene core having, on one or both of its surfaces, a 0.1 to 0.15 mil layer of a film comprised of a metallocene catalyzed polypropylene and a low molecular weight hydrocarbon resin, said resin being present in an amount up to about 15% by weight based on the total weight of the metallocene catalyzed polypropylene and the resin.

6. An oriented film according to claim 5 wherein the low molecular weight hydrocarbon resin is present in an amount up to about 10%.

7. An oriented film according to claim 5 wherein the low molecular weight hydrocarbon resin is present in an amount of about 1 to 5%.

* * * * *